United States Patent
Yoshino

Patent Number: 5,378,052
Date of Patent: Jan. 3, 1995

[54] ELECTRONIC BRAKE PEDAL ADJUSTMENT APPARATUS AND METHOD THEREFOR

[75] Inventor: Masato Yoshino, Itami, Japan

[73] Assignee: Sumitomo Electric Industries, Ltd., Osaka, Japan

[21] Appl. No.: 95,701

[22] Filed: Jul. 22, 1993

[30] Foreign Application Priority Data

Jul. 30, 1992 [JP] Japan .................. 4-203841

[51] Int. Cl.$^6$ .............................................. B60T 13/66
[52] U.S. Cl. ........................................ 303/3; 188/1.11; 303/15; 303/20; 303/100; 303/DIG. 4; 340/453
[58] Field of Search ............. 303/20, 3, 93, 91, 101, 303/15–18, 2, 113.4, 100, 97, 99, DIG. 3, DIG. 4; 188/1.11, 156, 158–165; 340/438, 453, 454, 460–467

[56] References Cited

U.S. PATENT DOCUMENTS

| | | | |
|---|---|---|---|
| 3,473,850 | 10/1969 | Lawrie | 303/14 X |
| 3,934,939 | 1/1976 | Hida | 303/100 |
| 4,327,414 | 4/1982 | Klein | 303/20 |
| 4,398,389 | 8/1983 | Horvath | 303/10 X |
| 4,419,654 | 12/1983 | Funk | 303/100 |
| 4,714,299 | 12/1987 | Takata et al. | 188/181 A |
| 4,818,036 | 4/1989 | Reinecke | 303/3 |
| 5,149,176 | 9/1992 | Eccleston | 188/1.11 |
| 5,172,785 | 12/1992 | Takahashi . | |

FOREIGN PATENT DOCUMENTS

| | | |
|---|---|---|
| 0106360 | 4/1984 | European Pat. Off. . |
| 4120069 | 1/1992 | Germany . |
| 59-18054 | 1/1984 | Japan . |

Primary Examiner—Douglas C. Butler
Attorney, Agent, or Firm—Sandler Greenblum & Bernstein

[57] ABSTRACT

An electronic brake pedal adjustment apparatus has an apparatus for setting braking characteristics by which the driver can enter the relationship between the desired brake fluid pressure with respect to a given brake pedal effort, a detector for detecting an actual brake pedal pressure; and a computer for calculating a desired brake fluid pressure based on the set braking characteristics for the detected brake pedal effort. A brake fluid pressure control device is also provided so as to make the actual brake fluid pressure commensurate with the calculated brake fluid pressure. The relationship between the desired brake fluid pressure and the given brake pedal effort is shown on a display.

12 Claims, 3 Drawing Sheets

ELECTRONIC BRAKE PEDAL ADJUSTMENT APPARATUS AND METHOD THEREFOR

BACKGROUND OF THE INVENTION

1. Field of the Invention

The present invention relates to an electronic brake pedal adjustment apparatus and, more particularly, to a device and method for setting braking characteristics, for enabling the driver to set the desired braking operation for a given brake pedal pressure within a safe range.

2. Description of the Prior Art

Vehicular brake pedal adjustment apparatuses that have been previously proposed include the electronic brake pedal adjustment apparatus, which comprises a sensor related to the brake pedal effort or brake pedal travel and a sensor related to the brake fluid pressure or vehicle deceleration, detects vehicle brake pedal pressure and calculates the desired brake fluid pressure using a computer, and adjusts the brake fluid pressure by a brake pressure controller.

Conventional electronic brake pedal adjustment apparatuses such as the above are intended, for example, to compensate for changes in the brake stroke effectiveness due to the carried load or the $\mu$ (coefficient of friction) of the friction material, or to obtain a stronger braking pressure with less strength required for brake operation or with a lighter pedal stroke. In any case, however, the brake designer sets the relationship between the brake pedal pressure or brake pedal travel and the brake fluid pressure, i.e., set the braking characteristics.

The present inventor has also proposed an apparatus using an electronic brake pedal adjustment apparatus to resolve the problem of the driver needing to continuously depress the brakes while stopped by automatically applying the brakes even after the brake is released, but only when it is confirmed from the detection signals from each of the sensors that the intention of the driver is to remain stopped. (Japanese Patent Laid-open Publication No. 59-18054)

Many recent vehicles enable the driver's seat to be adjusted in many ways, including front-back position, seat angle and height, and steering wheel position, thus allowing the driver to select the best positions for his/her height and physique.

Despite these various adjustments, it is still difficult for many drivers, who must use both the brakes and the steering wheel, to obtain a suitable combination of braking effect (brake fluid pressure) with respect to the applied braking force (brake pedal effort) because of the fixed position of the brake pedal and/or the fixed relationship between the brake pedal effort and the brake fluid pressure (vehicle deceleration).

The recent trend has also been towards brakes that can assure sufficient braking when operated with little effort, and towards brakes that can assure sufficient braking when operated with a short pedal travel.

It must be noted, however, that while many drivers like these trends as revealed in a survey conducted by the present inventors, there are small numbers of drivers that are not satisfied, feeling either that the trends have either not gone far enough or have already gone too far.

This dissatisfaction cannot be resolved even by using current electronic brake pedal adjustment apparatuses whereby the brake designer can freely set the braking characteristics.

The electronic brake pedal adjustment apparatus described in Japanese laid-open Patent No. 59-18054 reflects the intent of the driver in the braking characteristics, but is nothing more than a means for detecting, using sensors while the vehicle is stopped, whether the driver intends to remain stopped, and for automatically generating the brake pressure to keep the vehicle stopped; it does not propose a means enabling the driver to set the braking characteristics as desired while also in motion.

SUMMARY OF THE INVENTION

The object of the present invention is therefore to provide an electronic brake pedal adjustment apparatus enabling the typical driver, who is not the brake designer, to freely set the braking characteristics within a safe range, without error, and by means of the easiest operation possible.

To achieve this object, the present invention provides an electronic brake pedal adjustment apparatus comprising means for setting a desired braking characteristics which defines a relationship between a desired brake fluid pressure or vehicle deceleration with respect to a given brake pedal effort; brake pedal effort detection means for detecting an actual brake pedal effort; and control means for calculating a desired brake fluid pressure based on the set braking characteristics for the detected brake pedal effort.

The brake pedal effort detecting means may be a brake pedal travel detecting means which detects an actual brake pedal travel.

The electronic brake pedal adjustment apparatus further comprises brake fluid pressure control means for controlling an actual brake fluid pressure commensurate with the calculated brake fluid pressure.

The electronic brake pedal adjustment apparatus further comprises a display means for displaying the desired braking characteristics which defines the relationship between a desired brake fluid pressure with respect to a given brake pedal effort.

The electronic brake pedal adjustment apparatus further comprises brake fluid pressure detection means for detecting an actual brake fluid pressure, so that the display means further displays the actual brake fluid pressure with respect to the actual brake pedal effort.

One or more of the following display apparatuses is selectively used for the above display means:

(1) An LED matrix display;
(2) A display of LEDs arranged in a matrix only in the characteristics setting range;
(3) A display using LEDs emitting multiple colors for changing the color at the setting input points;
(4) A display wherein the emitted display color changes for the axis related to the settings input;
(5) Liquid-crystal display;
(6) A CRT display;
(7) A display sharing a CRT with a navigation or other functional system;
(8) A display using flexible optical fibers;
(9) A display using LEDs emitting multiple colors for changing the color at points corresponding to the brake operation input;
(10) A display using LEDs emitting multiple colors for changing the color at points corresponding to the braking apparatus operation; and
(11) A display integrating warning indicators, operating indicators, etc., related to the component elements of the electronically controlled brake system.

In the electronic brake pedal adjustment apparatus according to the present invention, the teton "brake pedal effort" used herein means not only the brake pedal stroke, but also push-rod stroke, push-rod compression stress, master cylinder piston stroke, and angle of rotation around the brake pedal support point, etc., and the brake master cylinder pressure, brake wheel cylinder pressure, brake booster operating pressure, brake booster operating rate, vehicle deceleration, or brake solenoid operating current can be selectively detected for brake fluid pressure.

The input means for the braking characteristics setting apparatus can be selected from any one of slide control, rotary control, location detector, keyboard, joystick, selector stick, and plural slide controls having a linking mechanism mechanically restricting the relative positions of the controls.

The present invention further provides a method for freely setting the braking characteristics using an apparatus for setting braking characteristics whereby the driver can enter the relationship between the desired fluid pressure and a given brake pedal effort.

According to the present invention, an electronic brake pedal adjustment method comprises the steps of: (a) setting a desired braking characteristics which defines a relationship between a desired brake fluid pressure with respect to a given brake pedal effort; (b) detecting an actual brake pedal effort; and (c) calculating a desired brake fluid pressure based on the set braking characteristics for the detected brake pedal effort.

The electronic brake pedal adjustment method further comprises the step of (d) controlling an actual brake fluid pressure commensurate with the calculated brake fluid pressure.

In the above method for setting the desired braking characteristics, the driver can enter the input data to the apparatus for setting desired braking characteristics by selecting among the following methods.

(1) Input the desired braking apparatus operation (brake fluid pressure) corresponding to a specified brake operation input (brake pedal effort).
(2) Input the desired brake operation input value required to obtain a specified braking apparatus operation.
(3) Input the brake operation input value and the desired braking apparatus operation for that braking apparatus operation value.
(4) Input the desired servo ratio.
(5) Store the set contents in nonvolatile memory, and input the stored data in the memory to the characteristics setting apparatus.

The function generated by the apparatus for setting braking characteristics is generated using one of the four methods below.

(1) A method whereby the zero point and the point(s) determined from the relationship between the desired braking apparatus operation (brake fluid pressure) and the brake operation inputs (brake pedal effort) for at least one point are joined in sequence in a straight line.
(2) A method whereby the point(s) determined from the relationship between the desired braking apparatus operation and the brake operation input for at least one point are joined in sequence in a straight line extending to the maximum brake operation input required to obtain the predetermined maximum braking apparatus operation.
(3) A quadratic function or hyperbolic function.
(4) A method providing exceptions for a specified range, and obtaining the function from the end of the specified range and a point determined by the relationship between the desired braking apparatus operation and the brake operation inputs for at least one point.

For the actual braking apparatus operation (brake fluid pressure) for the actual brake operation input (brake pedal effort), the braking apparatus operation is sequentially generated using a function referencing method selected from among the following methods.

(1) A method for calculating the coefficients of a specified function as a mathematical function, and calculating the desired braking apparatus operation for successive brake operation inputs.
(2) A method for calculating the coefficients of a specified function as a mathematical function, calculating the desired braking apparatus operations for specified brake operation inputs, storing the calculated values as a table in memory, and for each successive brake operation input, using the value from the table approximately equal to the brake operation input as the desired braking apparatus operation.
(3) A method for calculating the coefficients of a specified function as a mathematical function, calculating the desired braking apparatus operations for specified brake operation inputs, storing the calculated values as a table in memory, and for each successive brake operation input, using the two or more values from the table corresponding to the approximately equal brake operation input values as the desired braking apparatus operation.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENTS

The present invention is described in detail below with reference to the accompanying drawings.

Figure 1:
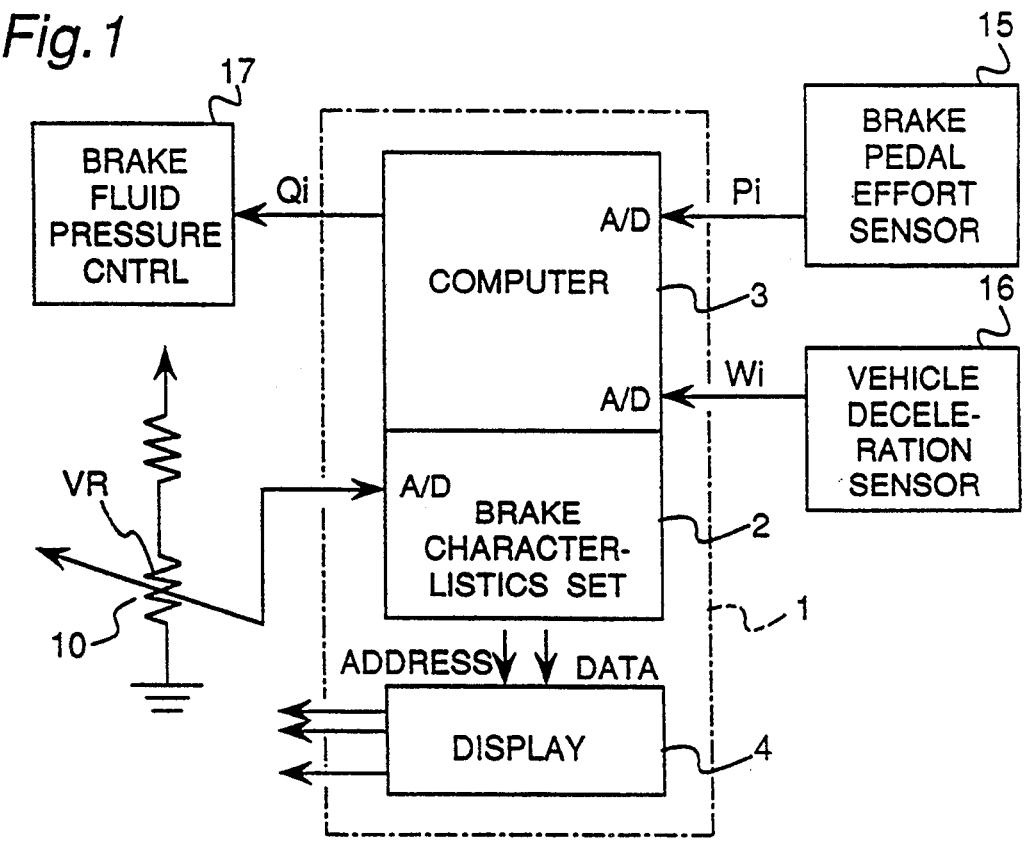
FIG. 1 is a block diagram of an electronic brake pedal adjustment apparatus according to the present invention.

As shown in FIG. 1, an electronic brake pedal adjustment apparatus 1 according to the present invention comprises an apparatus for setting braking characteristics 2, computer (control apparatus) 3, and display apparatus 4. Furthermore, a brake pedal effort sensor 15 for producing a data Pi indicating the brake pedal pressure, a vehicle deceleration sensor 16 for producing a data Wi indicating the vehicle deceleration which is in relation to the actual brake fluid pressure, and a brake fluid pressure control 17 for receiving a data Qi from computer 3 are provided. The brake fluid pressure control 17 controls the brake fluid pressure substantially equal to the required brake fluid pressure Qi as calculated in computer 3.

In an electronic brake pedal adjustment apparatus 1 according to the present invention, the various modes and methods described above are appropriately selected and combined for the input data and input means of the apparatus for setting braking characteristics 2, the function generation method and function referencing method of the computer 3, the types of display apparatus 4, and the detection methods of the brake operation input and the braking apparatus operation for which the detected values are output to the apparatus for setting braking characteristics 2 and to the computer 3.

In the preferred embodiment of the invention, the input data to the apparatus for setting braking characteristics 2 is for producing a desired brake fluid pressure for a specified brake pedal pressure. The input data is entered by shifting a knob 12 of an input device 10 connected to the braking characteristics setting apparatus 2. The input device 10 in the embodiment shown in FIG. 2 is a slide control having a variable resistor,r R, as shown in FIG. 1, which is changed relatively to the shifting of the knob 12, shown in FIG. 2.

The braking characteristics setting apparatus 2 and the display apparatus 4 are connected as shown in FIG. 1, enabling the data input to the braking characteristics setting apparatus 2 to be visually confirmed by the driver on the display apparatus 4.

Figure 2:
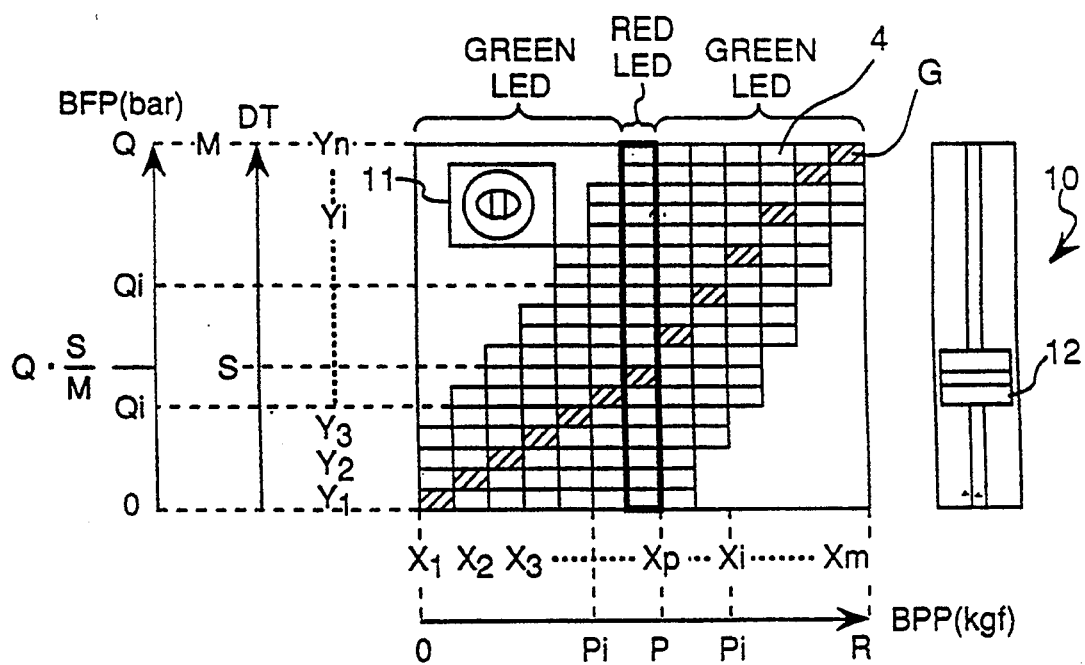
FIG. 2 is a front view of a display and an input device used in the apparatus of FIG. 1.

The display apparatus 4 is an LED array as shown in FIG. 2. The LED array is arranged in a matrix for expressing a graph in which the X-axis generally represents the brake pedal pressure and the Y-axis generally represents the brake fluid pressure. Along the X-axis, X1, X2, ..., Xp, ..., Xm represents the positions of the LEDs aligned horizontally, and a scale BPP represents actual brake pedal pressure. Along the Y-axis, Y1, Y2, ..., Yn represents the positions of the LEDs aligned vertically, and a scale DT represents data corresponding to the set position of the input device 10, and a scale BFP represents brake fluid pressure.

The LEDs are not located at the upper left corner portion and lower right corner portion, but are located only within the range in which the braking characteristics can be set.

According to the embodiment shown in FIG. 2, the LEDS in a predetermined center column Xp use red LEDs and the remaining LEDs use green LEDs, so as to particularly specify the column for setting the braking characteristics with the input device 10.

Instead of using red and green LEDs, it is possible to use LEDs emitting multiple colors so as to change the display color at a graph bending point, and use another color for the axis associated with the input setting with the input device 10.

A warning indicator 11 is also provided on the display apparatus 4 screen.

As shown in FIG. 2, the input device 10 is located adjacent the display 4 and has a length equal to the length of the Y-axis of the display 4. The slide knob 12 of the input device 10 can be shifted up and down along the input device 10 to change the resistance of the variable resistor VR provided in the input device 10. A voltage signal obtained by the variable resistor VR is applied to the braking characteristics setting apparatus 2, and is converted to input data S.

According to the present embodiment, Xp is preselected to be equal to P(kgf) (=7(kgf)) of the brake pedal pressure, but can be made variable. To change the Xp, it is necessary to provide another input device (not shown) which extends in the X-axis direction.

According to the present embodiment, by sliding the knob 12, the height of the mid point C along the center column Xp is selected. Then, in a manner described later, a first braking characteristics line extending between the zero point and mid point C is depicted by the activation of the LEDs which falls along the first characteristics line. Similarly, another braking characteristics line extending between the mid point C and the normal maximum braking point G, which is at the top left end LED, is depicted. Then, a relationship between the brake pedal pressure and the brake fluid pressure along the first and second characteristics lines depicted on the display 4 is realized.

It is assumed that when the slide knob 12 is shifted to the top of the input device 10, a voltage Vmax is produced from the variable resistor VR and this voltage Vmax is converted to input data M (=180). When the maximum brake fluid pressure is Q (=90 bar), a ratio $$Q{:}M = Q_{set}{:}S$$

is obtained, in which S is the input data obtained by shifting the knob 12 to a desired position, and $Q_{set}$ is the brake fluid pressure corresponding to the input data S.

Thus, the following equation (1)

$$Q_{set} = Q \cdot \frac{S}{M} \quad (1)$$

is obtained.

Since the zero point and the maximum braking point G (e.g., BPP=R(kgf)=15(kgf), and BFP=Q(bar)=90(bar)) are previously fixed, the selection of the mid point C by the shifting of knob 12 determines the two braking characteristics lines.

The first braking characteristics line between the zero point and the mid point C can be given by the following equation (2).

$$Qi = \frac{Q \cdot S}{P \cdot M} \cdot Pi \quad (2)$$

is obtained.

Similarly, the second braking characteristics line between the mid point C and the maximum braking point G can be given by the following equation (3)

$$Qi = Q - \frac{Q - Q \cdot \frac{S}{M}}{R - P} (R - Pi) \quad (3)$$

is obtained.

Figure 3A:
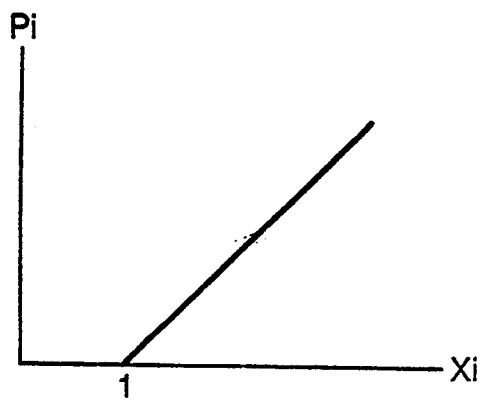
FIGS. 3a and 3b are graphs showing a relationship between Pi and Xi and between Qi and Yi, respectively, which are the scales used in the display.

The relationship between Xi and Pi can be given by the following equation (4), $$Pi = \frac{R}{Xm - 1} \cdot (Xi - 1) \quad (4)$$

and is shown in a graph of FIG. 3a.

Figure 3B:
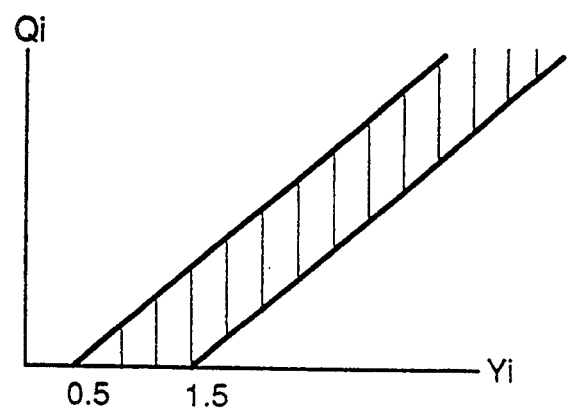

Similarly, tile relationship between Yi and Qi can be given by the following equation (5), $$\frac{Q}{Yn - 1} \cdot (Yi - 1.5) < Qi \leq \frac{Q}{Yn - 1} \cdot (Yi - 0.5) \quad (5)$$

and is shogun in a graph of FIG. 3b. The reason why data Qi has some width is because the brake fluid pressure may change relatively to the temperature, amount of fluid in the brake system, and some other factors.

Thus, when the user selects the mid point C by shifting the knob 12, the computer 3 calculates the first and second braking characteristics lines using the above equations (2) and (3). Then, for each of the columns X1, X2, ..., Xm, the plotting points Yi is calculated using equations (4) and (5). Thus, on the display 4, the calculated result is indicated. In FIG. 2, the LEDs with shaded lines are lit to show the first and second braking characteristics lines.

Also, when the driver uses the brake within the range between O(kgf) and P(kgf), i.e., within the first braking characteristics, the computer 3 receives data Pi from the brake pedal effort sensor 15 and calculates, using equation (2), the desired brake fluid pressure Qi which is supplied to the brake fluid pressure control 17. Thus, the actual brake is controlled to produce the brake fluid pressure Qi by a known brake control system.

Similarly, when the driver uses the brake within the range between P(kgf) and G(kgf), i.e., within the second braking characteristics, the computer 3 receives data Pi from the brake pedal effort sensor 15 and calculates, using equation (3), the desired brake fluid pressure Qi which is supplied to the brake fluid pressure control 17. Thus, the actual brake is controlled to produce the brake fluid pressure Qi by a known brake control system.

In the above embodiment, it is further possible to receive actual brake fluid pressure Wi from the brake fluid pressure sensor 16, and indicate the actual brake fluid pressure on display 4. For this purpose, Yi is calculated for the detected Wi by equation (6)

$$\frac{Q}{Yn - 1} \cdot (Yi - 1.5) < Wi \leq \frac{Q}{Yn - 1} \cdot (Yi - 0.5) \quad (6)$$

and the calculated result is used for activating an LED in a column corresponding to the applied brake pedal pressure. In this case, the LEDs in the display are preferably formed by multiple color emitting LEDs to show the actual brake fluid pressure point by a color other than that used for showing the first and second braking characteristics lines.

Figure 4:
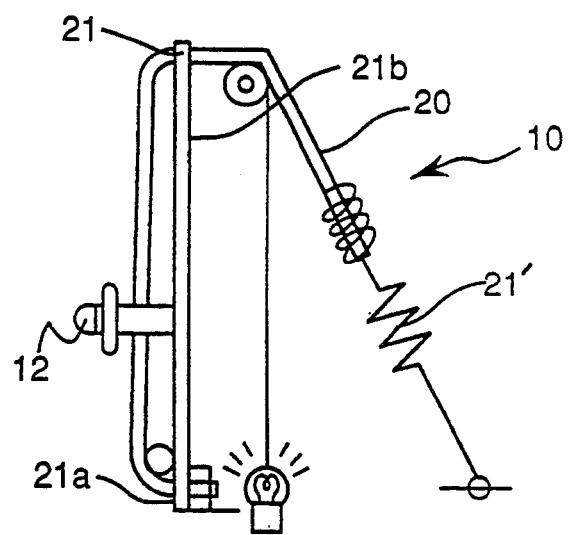
FIG. 4 is a side view of a display according to one modification.
Figure 5:
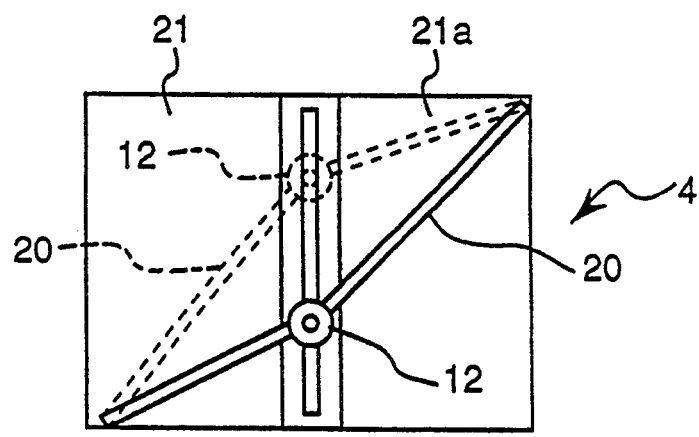
FIG. 5 is a front view of a display according to one modification.

Referring to FIGS. 4 and 5, a modification of the display apparatus 4 is shown. Instead of using the LED array, a flexible optical fiber 20 and a panel 21 are used. The panel 21 has the input device 10 mounted at about the center thereof, and knob 12 is slidably engaged with the flexible optical fiber 20. The flexible optical fiber 20 is tensioned to the front surface side 21a of the panel 21, and extends diagonally from the bottom left corner to the top right corner.

One end of the flexible optical fiber 20 at the bottom left corner is pulled out to the back surface side 21b from the position corresponding to the 0 bar brake fluid pressure, 0 kgf brake pedal pressure point on the panel member 21 and secured near a lamp 22. Thus, the light emitted by the lamp 22 is conducted through the flexible optical fiber 20.

The other end of the flexible optical fiber 20 paths through a hole or a recess formed at the top right corner of the panel 21 and is connected to a tension spring 21'.

When the knob 12 is moved up or down in FIG. 5 to set the mid point C, the flexible optical fiber 20 on the front surface side 21a of the panel member 21 is correspondingly deformed as shown by the real line and the dotted line in FIG. 5, and the braking characteristics are displayed. Also, in response to the setting of the mid point C, the brake fluid pressure control 17 controls the brake fluid pressure to be in the characteristics shown by the graph using the flexible optical fiber 20.

Figure 6:
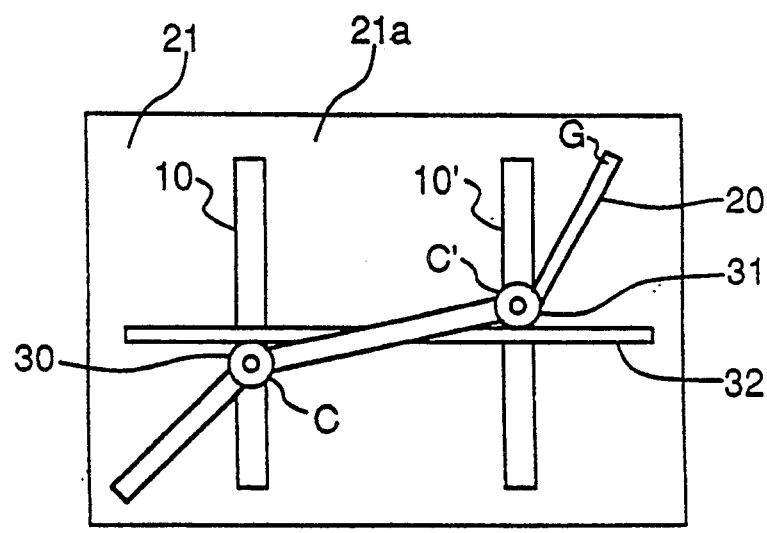
FIG. 6 is a front view of a display according to another modification.

Referring to FIG. 6, another modification of the display apparatus 4 is shown. In this modification, two input devices 10 and 10' are provided to set first and second mid points C and C' so as to provide first braking characteristics line (from zero to C), second braking characteristics line (from C to C') and third braking characteristics line (from C' to G). Therefore, a low pressure knob 30 provided to the first input device 10 sets the brake pedal pressure for a relatively low region, and a high pressure knob 31 provided to the second input device 10' sets the brake pedal pressure for a relatively high region. Both the low and high pressure knobs 30, 31 are connected to the flexible optical fiber 20. A constraining bar 32 extending horizontally in FIG. 6 is connected to the bottom end of the high pressure knob 30 so that knob 31 can not be shifted lower than the setting position of the knob 30. Other features of this modification are the same as those described above.

In this modification, since there are two input devices 10 and 10', the braking characteristics can be adjusted at two points, and thus the driver can adjust the braking characteristics more precisely.

In addition, the constraining bar 32 moves up and down in conjunction with the high pressure knob 30, preventing the high pressure knob 31 from being set lower than the low pressure knob 30. As a result, undesirable braking characteristics wherein the brake pressure drops as the brake pedal is depressed, will not be set.

An electronic brake pedal adjustment apparatus according to the present invention shall not be limited to the embodiment and modifications described above, and the input device and input data for the apparatus for setting braking characteristics 2 can be selected from among the various options described before.

Similarly, the detection means for the brake pedal pressure and the detection means for brake fluid pressure can be appropriately selected from the previously described detection means.

In addition, the method of generating the function by computer 3 from the set mid point(s), and the function referencing method calculating the desired brake fluid pressure for the actually applied brake pedal pressure from the generated function, can also be appropriately selected from the previously described methods.

A variety of selections is thus possible for the various component elements, and an electronic brake pedal adjustment apparatus according to the present invention can be comprised from a combination of appropriate elements.

As will be known from the above description, in an electronic brake pedal adjustment apparatus according to the present invention, the driver can set any personally preferred braking characteristics by providing an apparatus for setting braking characteristics, and the braking characteristics desired by the driver can be obtained In addition, the settings can be made easily while viewing the display apparatus because the set braking characteristics are made visible by the display apparatus. When the relationship between the actual brake pedal pressure and actual braking fluid pressure based on the set braking characteristics is simultaneously displayed, the braking characteristics set by the driver can be easily confirmed during actual brake operation. A guide for subsequently changing the braking characteristics as necessary can thus be obtained.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An electronic brake pedal adjustment apparatus comprising:
   means for setting a braking characteristic which defines a relationship between a desired brake fluid pressure with respect to a given brake pedal effort;
   brake pedal effort detection means for detecting an actual brake pedal effort;
   control means for calculating a desired brake fluid pressure based on the set braking characteristics of the detected brake pedal effort; and
   brake fluid pressure control means for controlling an actual brake fluid pressure commensurate with the calculated brake fluid pressure.

2. An electronic brake pedal adjustment apparatus as claimed in claim 1, further comprising a display means for displaying said desired braking characteristics which defines the relationship between a desired brake fluid pressure with respect to a given brake pedal effort.

3. An electronic brake pedal adjustment apparatus as claimed in claim 2, wherein said display means comprises LEDs.

4. An electronic brake pedal adjustment apparatus as claimed in claim 2, wherein said display means comprises a liquid crystal display.

5. An electronic brake pedal adjustment apparatus as claimed in claim 2, wherein said display means comprises a cathode ray tube.

6. An electronic brake pedal adjustment apparatus as claimed in claim 2, wherein said display means comprises flexible optical fiber.

7. An electronic brake pedal adjustment apparatus as claimed in claim 2, further comprising brake fluid pressure detection means for detecting an actual brake fluid pressure.

8. An electronic brake pedal adjustment apparatus as claimed in claim 7, wherein said display means further displays the actual brake fluid pressure with respect to the actual brake pedal effort.

9. An electronic brake pedal adjustment apparatus as claimed in claim 1, wherein said braking characteristics setting means comprises an input means for inputting a mid point data and calculation means for calculating said relationship at different regions divided by said mid point data.

10. An electronic brake pedal adjustment apparatus as claimed in claim 9, wherein said input means comprises a variable resistor.

11. An electronic brake pedal adjustment apparatus as claimed in claim 10, wherein said input means further comprises a knob which slides along said variable resistor.

12. An electronic brake pedal adjustment method comprising:
   (a) setting a braking characteristic which defines a relationship between a desired brake fluid pressure with respect to a given brake pedal effort;
   (b) detecting an actual brake pedal effort;
   (c) calculating a desired brake fluid pressure based on the set braking characteristics for the detected brake pedal effort; and
   (d) controlling an actual brake fluid pressure commensurate with the calculated brake fluid pressure.

* * * * *